United States Patent
Esser et al.

[11] Patent Number: 5,814,900
[45] Date of Patent: Sep. 29, 1998

[54] DEVICE FOR COMBINED TRANSMISSION OF ENERGY AND ELECTRIC SIGNALS

[75] Inventors: Albert Esser, Schenectady, N.Y.;
Ulrich Schwan, Salem-Beuren, Germany

[73] Assignee: Ulrich Schwan, Salem-Beuren, Germany

[21] Appl. No.: 345,202

[22] Filed: Nov. 25, 1994

Related U.S. Application Data

[63] Continuation-in-part of Ser. No. 922,191, Jul. 30, 1992, abandoned.

[30] Foreign Application Priority Data

Jul. 30, 1991 [DE] Germany ............... 41 25 145.8

[51] Int. Cl.$^6$ ................................... H04B 5/00
[52] U.S. Cl. ..................... 307/104; 340/310.07
[58] Field of Search ............... 307/104, 17, 109; 340/310.01, 310.06, 310.07; 336/DIG. 2; 439/950; 455/41; 343/841, 856, 788

[56] References Cited

U.S. PATENT DOCUMENTS

| | | | |
|---|---|---|---|
| 3,387,606 | 6/1968 | Crafts et al. | 128/141 |
| 3,743,989 | 7/1973 | Nicolas et al. | 336/5 |
| 3,758,845 | 9/1973 | MacKelvie et al. | |
| 4,011,551 | 3/1977 | Adler. | |
| 4,473,817 | 9/1984 | Perkins | 340/310.07 |
| 4,558,320 | 12/1985 | Pedrazza. | |
| 4,675,638 | 6/1987 | Szabo | 336/120 X |
| 5,055,775 | 10/1991 | Scherz et al. | |
| 5,455,467 | 10/1995 | Young et al. | 340/310.07 |

FOREIGN PATENT DOCUMENTS 3402351   1/1984   Germany.

*Primary Examiner*—Richard T. Elms
*Attorney, Agent, or Firm*—Robert W. Becker & Associates

[57] ABSTRACT

A device in the form of a transformer for transmitting electrical energy is comprised of a core of a ferromagnetic material and a primary coil and a secondary coil wound about the core. At least one receiver in the form of an areal antenna and at least one sender in the form an areal antenna are arranged in the direct vicinity of the primary and secondary coils for a contact-free transmittal of changing signals. The receiver and the sender are connected interchangeably to receiving and sending electronics devices, whereby the receiver and the sender form a constructive unit with the primary coil, the secondary coil, and optionally the core. The device allows the simultaneous transmittal of electric energy between components that are adjustable relative to one another as well as the transmittal of changing signals. The power transmittal in the kilowatt range is only limited by the respective constructive size of the device. A high data transmittal rate of analog or digital changing signals is possible.

42 Claims, 17 Drawing Sheets

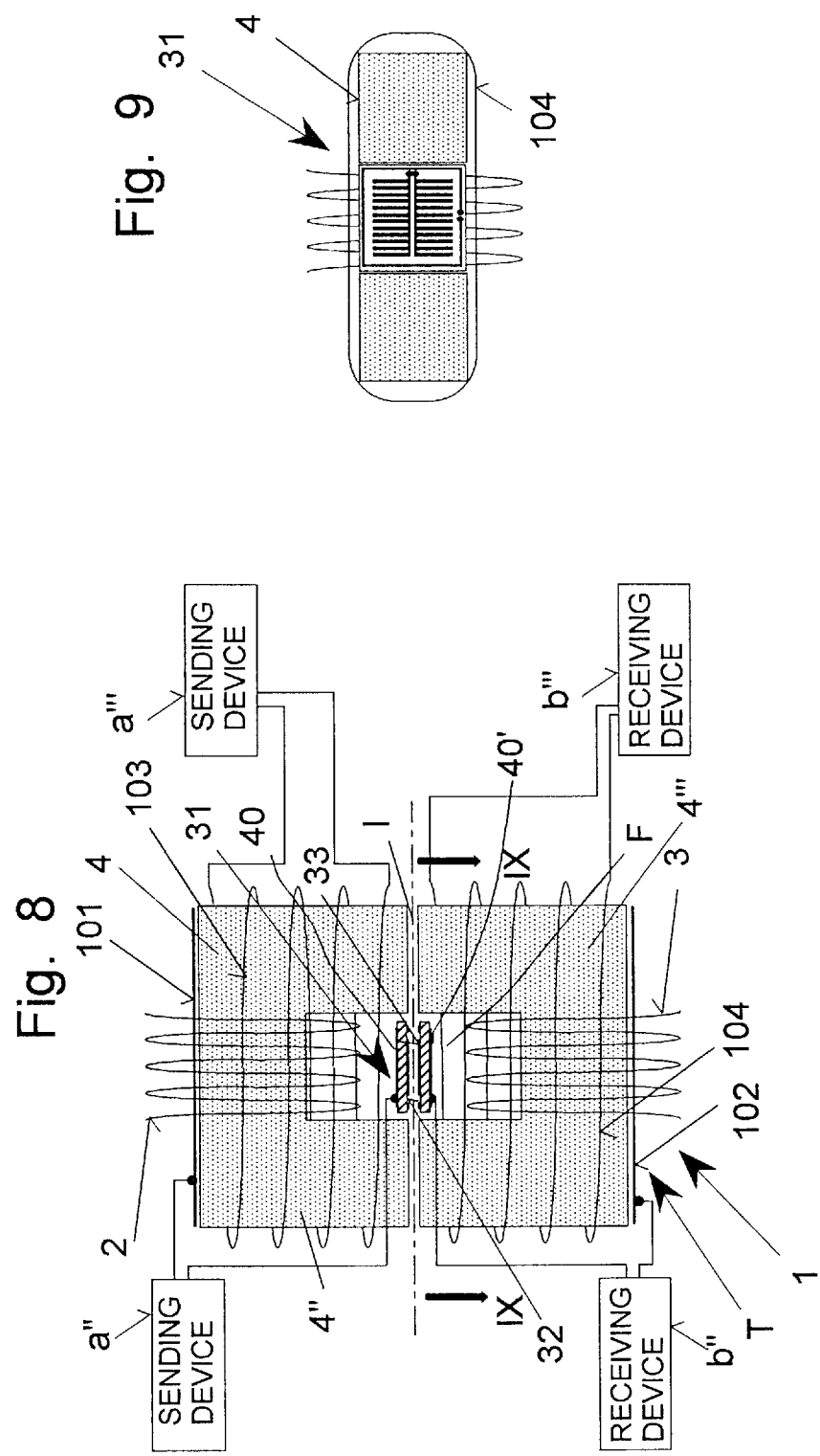

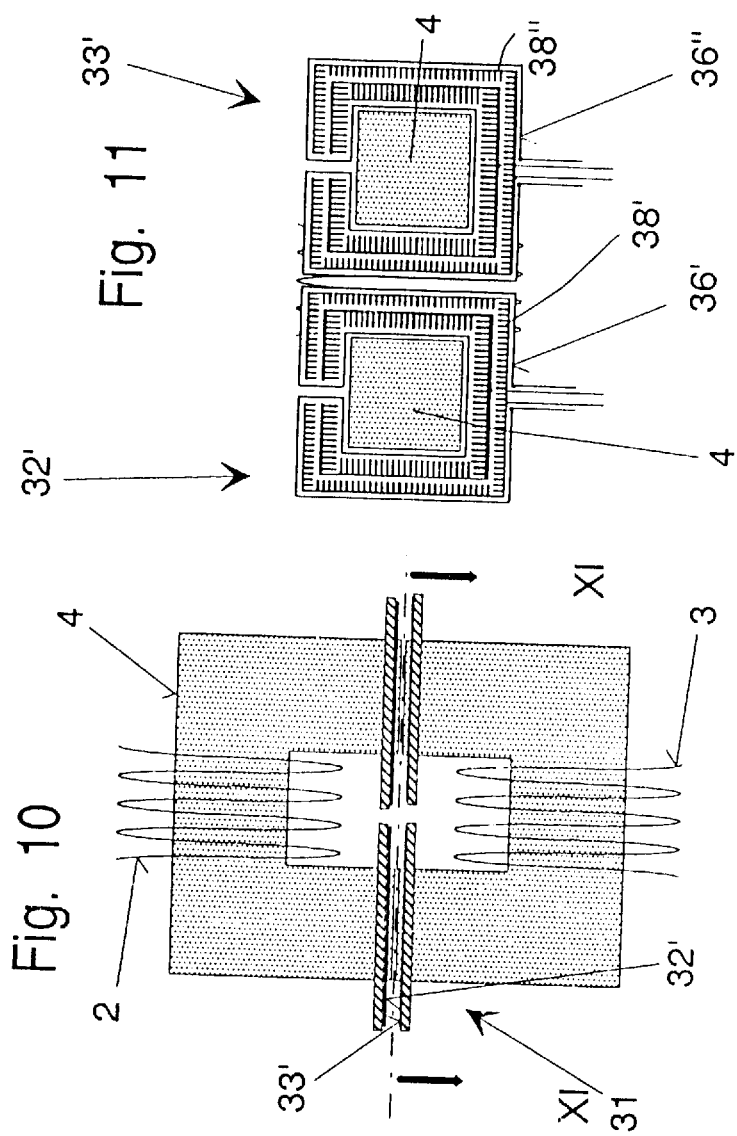

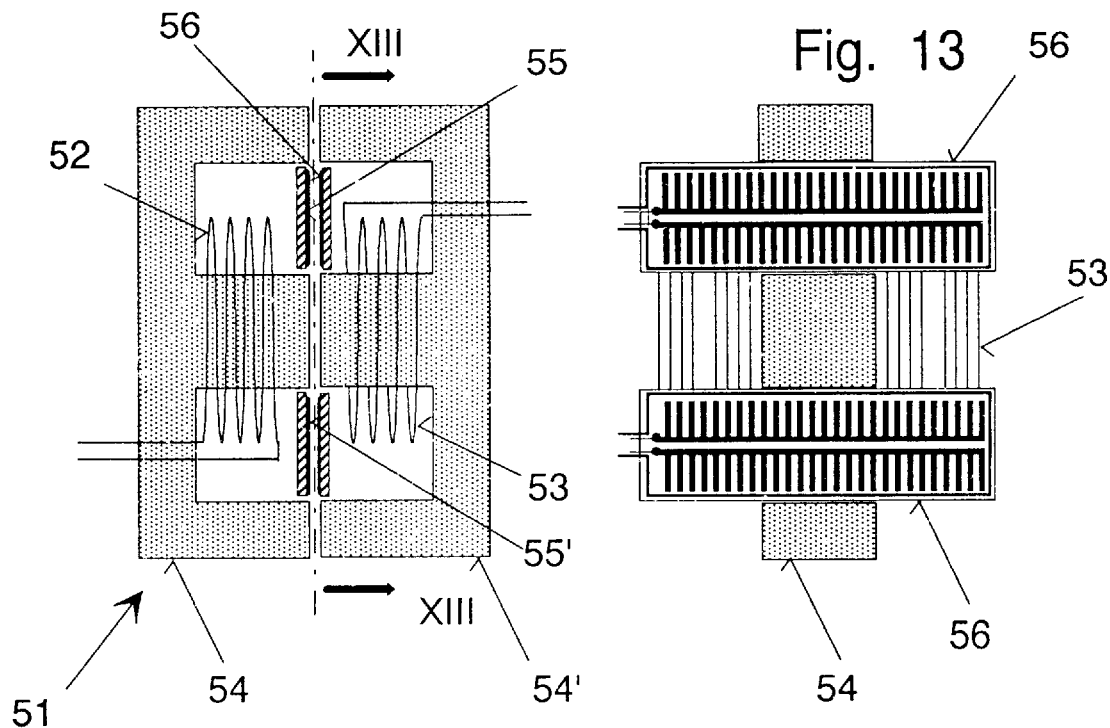
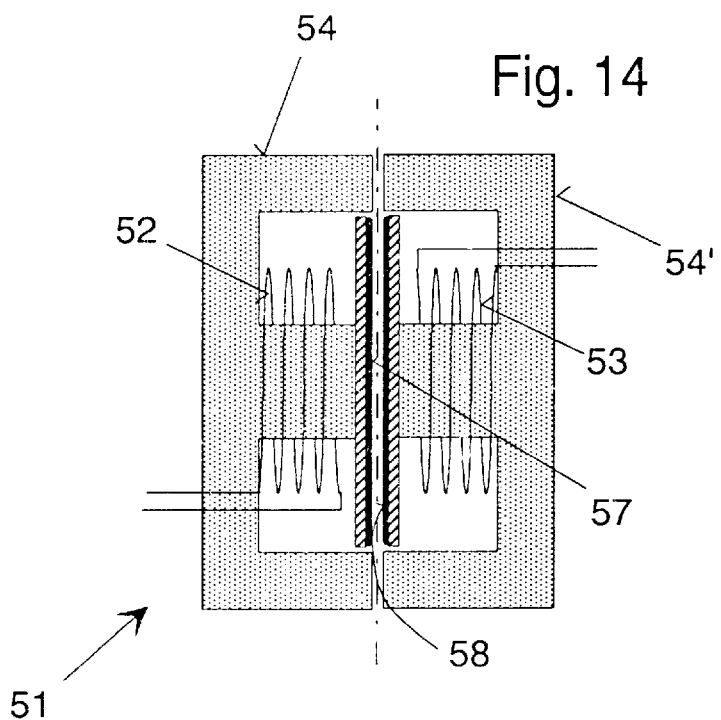

DEVICE FOR COMBINED TRANSMISSION OF ENERGY AND ELECTRIC SIGNALS

This application is a continuation-in-part of application Ser. No. 07/922,191 filed Jul. 30, 1992 now abandoned.

FIELD OF THE INVENTION

The present invention concerns a device for a contact-free transmittal (no direct connections) of electrical energy and control data between two machine parts that are moveable, rotatable, slidable or displaceable relative to one another, for example, two components of a robot arm that are rotatable relative to one another.

BACKGROUND OF THE INVENTION

The present invention relates to a device for transmitting electrical energy. The device is in the form of a transformer with a primary coil, a secondary coil, and a core of ferromagnetic material.

Transformers of the aforementioned kind are known in various embodiments and have been successfully employed for transforming high voltage alternating current into low voltage alternating current and vice versa. However, during this transformation magnetic interference fields are observed which cause hum voltage in adjacently located devices. Despite extensive shielding, sensitive devices, especially devices for transmitting changing signals, cannot be positioned in the direct vicinity of a transformer.

However, it is often desirable to use a device not only for transmitting electrical energy or in the alternative for changing signals, but to be able to employ both transmittal fashions at the same time. Such a device is known from German Offenlegungschrift 34 02 351. A sender and a receiver which are interchangeably connectable to a sending electronic device and a receiving electronic device, are provided for a contact-free (i.e., without direct connection) transmittal of changing signals, especially for operating sensors, between a rotating and a stationary machine part. With the same device auxiliary energy is also transmitted.

In this known device, the sender and the receiver are provided in the form of two coils which are concentrically arranged within one another in the rotatably drivable machine part and the housing receiving this machine part. With a second inductively coupled coil pair the auxiliary energy is transmitted between the two machine parts.

With this known embodiment measured data and auxiliary energy may be transmitted in a contact-free manner between two machine parts that are rotatable relative to one another; however, this device requires great constructive space since the two coils inserted into one another are bulky. It is especially disadvantageous that shielding requires a great constructive expenditure and that susceptibility to trouble is great due to the generated magnetic fields. Since the coils have internal coil capacities and the transmittal does not take place without iron which inherently causes losses, the known device is only suitable for the transmittal of certain frequencies. The field of application of this device is thus limited.

It is therefore an object of the present invention to provide a device of the aforementioned kind for transmitting electrical energy with which simultaneously changing (control) signals may be transmitted between components that are adjustable, i.e., rotatable, displaceable, slidable or moveable, relative to one another. It is desired that the limitation of the respective power transmittal be only limited by the respective constructive size. It is furthermore desired that a high rate of data transmittal be possible in both directions. The device should be constructively very simple and thus economical to manufacture, but also be small in size and suitable for a great variety of applications. Also, a special shielding of the sender and receiver, that are designed to transmit the changing (control) signals, against interference fields of the device should not be required.

BRIEF DESCRIPTION OF THE DRAWINGS

This object, and other objects and advantages of the present invention, will appear more clearly from the following specification in conjunction with the accompanying drawings, in which:

FIG. 8 is a transformer in an axial cross-section with antennas of FIGS. 6 and 7 arranged within its coil field;

FIG. 9 is a cross-section along the line IX—IX of FIG. 8;

FIG. 10 is a transformer in an axial cross-sectional view with antennas surrounding the core according to FIG. 6;

FIG. 11 is a section along the line XI—XI of FIG. 10;

FIG. 12 shows a transformer in an axial sectional view with antennas arranged within the coil field according to FIG. 6;

FIG. 13 is a section along the line XIII—XIII of FIG. 12;

FIG. 14 is a further embodiment of a transformer provided with antennas according to FIGS. 10 and 11;

SUMMARY OF THE INVENTION

Figure 1:
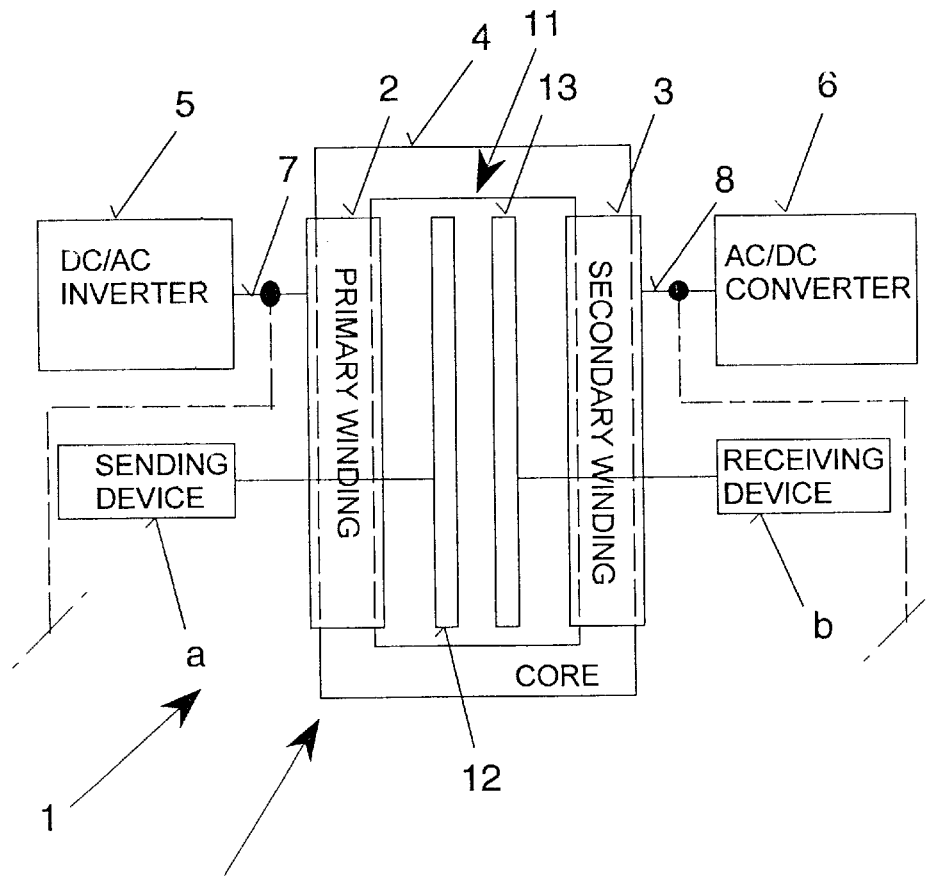
FIG. 1 is an inventive transmitting device in the form of a transformer for transmitting energy, having a sender and a receiver for transmitting changing signal in a contact-free manner.

The device of the present invention is used to simultaneously transmit electric energy (power) and changing signals (switching signals or control signals) preferably between two machine parts that are movable or rotatable or adjustable or slidable relative to one another, in particluar between a stationary and a rotating or sliding machine part. This is, for example, necessary in centrifuges, robots, machinery operating in dusty or wet environments, in machine tools, turntables, and in machinery used under water. With the inventive device the conventional sliprings used in such applications can be replaced. Another field of application for the inventive device is the replacement of conventional connectors, for example, in machinery that requires a long service life (railways and off-shore systems) and in battery charging systems. For example, the inventive device can charge different types of batteries at the same time. The inventive device can also be used to replace cables in linearly movable systems. The advantages of the present invention are the following: easy handling, detachable without sparks (important in explosive environments), galvanic insulation, and voltage translation.

The device according to the present invention in the form of a transformer for transmitting electrical energy is primarily characterized by a core of a ferromagnetic material; a primary coil and a secondary coil wound about the core; a receiving electronic device and a sending electronic device; at least one receiver in the form of an areal antenna and at least one sender in the form of an areal antenna in direct vicinity of the primary and the secondary coils for a contact-free (i.e., without direct connections) transmitting of changing signals, the receiver and the sender connected interchangeably to the receiving electronic device and the sending electronic device, with the receiver and the sender forming a constructive unit with the primary coil, the secondary coil, and optionally the core.

It is advantageous to provide the device with rigid supports made of an insulating material, whereby the receiver and the sender are each connected to one of the supports and arranged directly opposite one another. Preferably the supports have a shape such as a plate, a disk, a cylinder, a sphere, or a parallelepiped.

For the inductive transmittal of changing signals, the antennas connected to the supports are in the form of a printed circuit board or in the form of at least one closed lead areally connected to the support. Preferably, the closed lead is a conductive loop in the shape of a rectangle or a polygon. The conductive loop may also be in the shape of a discontinuous circular loop or a discontinuous rectangular loop.

For the capacitive transmittal of changing signals, the antennas are in the form of at least one capacitor areally connected to the support. Preferably, the capacitor is comprised of a metal foil, a metallic lacquer film, or a circuit board.

In this particular embodiment, the capacitor may be comprised of two comb-shaped parts, each comb-shape part having a connecting stay and a plurality of capacitor plates spaced from one another, with the connecting stays preferably centrally connected to the supports and with the capacitors plates of the capacitors facing outwardly. It is also possible to provide the capacitor in the form of at least two concentrically arranged, annular capacitor plates. Preferably, such a capacitor has slots, preferably radially extending slots.

For inductively and/or capacitively transmitting changing signals the antennas may be provided as closed leads in the form of conductive loops and capacitors whereby the capacitors are comb-shaped and arranged within the conductive loops that are either in the shape of a rectangular conductive loop or a discontinuous rectangular conductive loop. As an alternative, the capacitors are annularly shaped and inserted into a conductive loop formed as a discontinuous circular ring. The capacitor in this embodiment may have radially extending slots.

In a preferred embodiment, the supports, on a side thereof remote from the antennas, have an areal shield. These areal shields may serve as capacitors and may be used for transmitting changing signals. For this purpose it is only necessary to connect the areal shields to the sending electronic device and the receiving electronic device, respectively.

It is also possible to use the core of the transformer as a capacitor. For this purpose, the core of the transformer has two halves, each half respectively connected to the sending electronic device and the receiving electronic device. It is expedient in this embodiment to provide an air space between the two halves, whereby each half has an end face arranged remote from the air space and extending parallel to the air space that is coated with an electrically conductive coating. Preferably, the electrically conductive coating is a metallic lacquer film.

The capacitors consisting of the shields of the supports and the two halves of the core are expediently connected to a common sending electronic device and receiving electronic device and are switchable in push-pull operation cycle.

For inductively transmitting changing signals the two halves each may be provided with a further coil arranged transverse (orthogonal) to the primary coil and the secondary coil, respectively, and connected to the sending electronic device and the receiving electronic device, respectively.

In a preferred embodiment of the present invention, the primary coil and the secondary coil are adjustable relative to one another, preferably, linearly slidable to one another, whereby the primary coil and the secondary coil are of different size in the direction in which they are linearly slidable. It is also possible that the primary coil and the secondary coil are rotatable relative to one another. In another embodiment the antennas are adjustable relative to one another, preferably linearly slidable relative to one another whereby the antennas are of a different size in the direction in which they are linearly slidable. It is also possible that the antennas are rotatable relative to one another.

In order to increase the range of applications, it is possible to provide at least one and preferably more primary coils having coordinated thereto at least one, preferably more secondary coils. In this embodiment, at least one of the antennas coordinated with the primary coil has coordinated thereto at least one, preferably more, antennas coordinated with the secondary coil.

Advantageously, the transformer has a coil window with the antennas arranged in pairs in the coil window. Preferably, in this embodiment the antennas are in the form of at least one discontinuous rectangle or at least one discontinuous circular ring. It is also possible that the antennas are in the form of at least one rectangular discontinuous ring surrounding legs of the core.

It is furthermore expedient to insert the antennas individually or together into a housing which encloses the antennas partially or completely, the housing preferably made of a ferromagnetic material.

When a device for transmitting energy according to the present invention is embodied with the inventively designed antennas it is possible to transmit in a contact-free manner high energies within the kilowatt range and it is also possible to transmit in a force-free and contact-free manner (without direct connection) analog or digital changing signals from a sender to a receiver without problems in an interference-free operation. Furthermore, with the inventive device a high data transmittal rate is possible. When the sender and the receiver are embodied as areal antennas connected to a rigid support and arranged directly opposite one another these antennas may be shielded in a very simple manner against interference fields of the transformer coils. The energy transmittal is only limited by the respective constructive size of the device. Since the inventively embodied device has only a relatively small weight and is of a small size requiring only a very limited constructive space for its attachment to respective machine parts, the inventive device is usable in many applications that will be apparent to a person skilled in the art.

Description of Preferred Embodiments

The present invention will now be described in detail with the aid of several specific embodiments utilizing FIGS. 1 through 27.

FIGS. 1–7 show only the general operating principle and necessary connections of components of the inventive device as a power and data transmitter without taking into consideration practical matters with respect to movability of the machine parts to which the device would be connected (i.e., the core is shown undivided). Practical realizations are shown in FIGS. 8–21.

Figure 21:
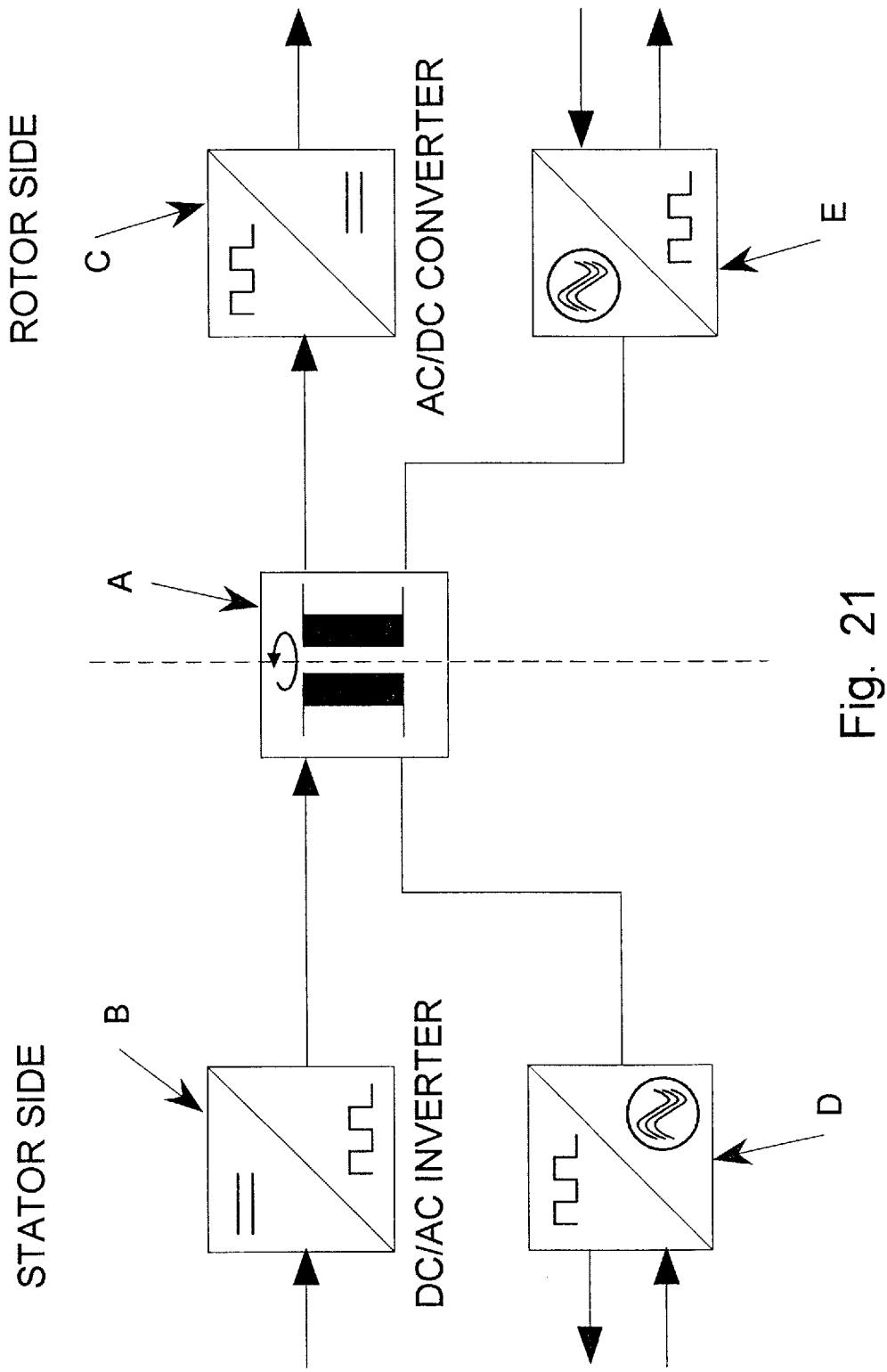
FIG. 21 is a schematic circuit diagram illustrating the use of the inventive device A as a transmitting device for energy and data between a stator side B, D and a rotor side C, E.

FIG. 21 shows a schematic representation of the invention with a stator side B, D and a moveable (rotatable) user side C and E (rotor side) with the interface in the form of the transmitting device A comprising power transmitter and data transmitter. An arrow within the box diagram of the transmitting device A indicates its rotatability. Power is transmitted from the inverter B (converts direct current dc to alternating current ac) via the transmitting device A to the converter C (converting ac to dc). Data are transmitted bidirectionally via the transmitting device A between the electronic devices D and E (preferably in the form of conventional electronic components such as RS 232, RS 485, CAN-BUS, INTERBUS, PROFIBUS-DP etc. well known to a person skilled in the art)

The device 1 schematically represented in FIG. 1 serves to transmit electric energy as well as changing (control) signals between a sending electronic device a and a receiving electronic device b and is comprised of a transformer T having a primary coil 2, a secondary coil 3, and a core 4. A data transmittal unit 11 is also shown. An inverter 5 is connected via a line 7 to the primary coil 2 of the transformer T. A connecter 6 is connected via line 8 to the secondary coil 3.

Figure 4:
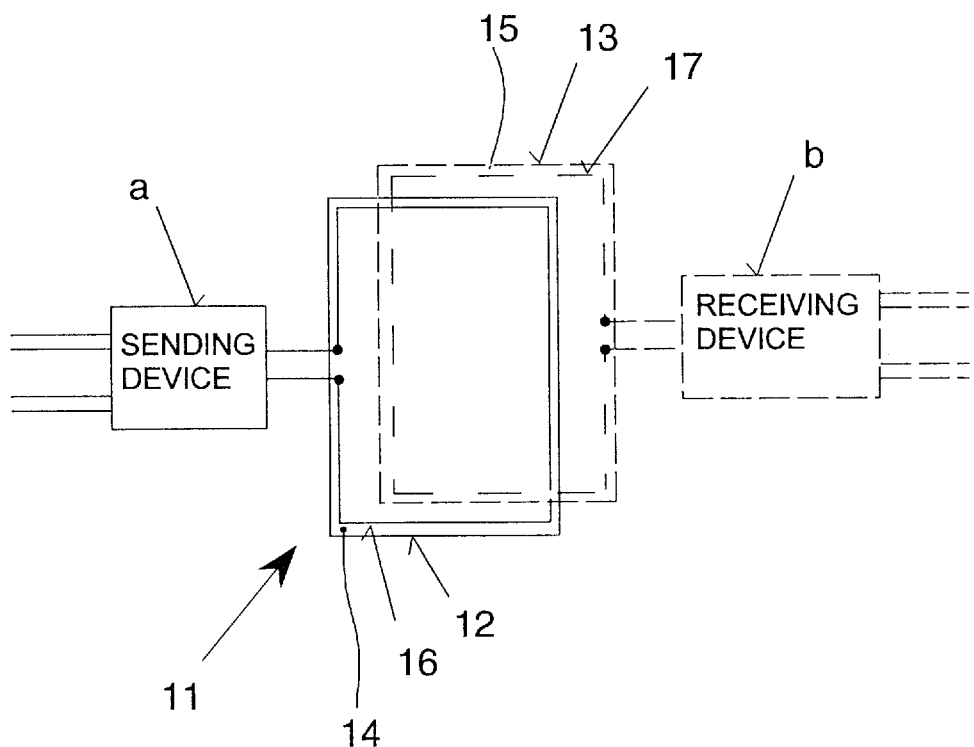
FIG. 4 shows two antennas in the form of conductive loops arranged on planar supports for inductively transmitting changing signals in a transmitting device according to FIGS. 1 to 3.
Figure 4A:
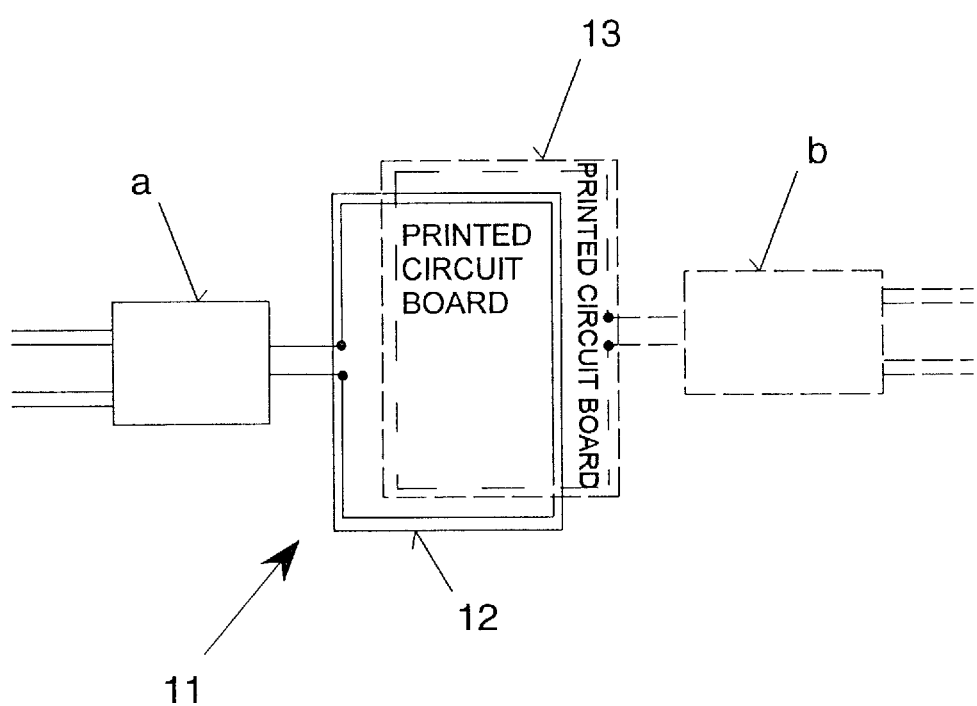
FIG. 4a shows two antennas embodied as printed circuit boards.

The data transmittal unit 11 is provided with two areal antennas 12 and 13 which are arranged opposite one another and are shown in more detail in FIG. 4. The antennas 12 and 13 serve as the sender, respectively, receiver. The antennas 12 and 13 are connected to a rigid support 14, respectively, 15 made of insulating material and are in the form of closed conductive loops 16, respectively, 17 which are rectangular and arranged in a common plane. The two antennas provide a contact-free transmittal (no direct connection is present) of data.

During a transmittal of changing signals, depending on which one of the antennas 12 and 13 serves as a sender, a magnetic field is generated within one of the antennas whereby in the other one of the antennas serving as a receiver a voltage is generated which may be evaluated with the receiving electronic device b, respectively, a connected thereto.

During energy transmittal from the primary coil 2, which is supplied by the inverter 5, an alternating current of an identical frequency is induced in the secondary coil 3 of the transformer T as a function of the changing magnetization of the core 4, the alternating current being transformed within the inverter 6 into a direct current for supplying a motor. The resulting interference fields will not affect the data transmittal unit 11 due to the special embodiment of the antennas 12 and 13 so that with these antennas changing signals may be transmitted during the transmittal of electric energy.

Figure 2:
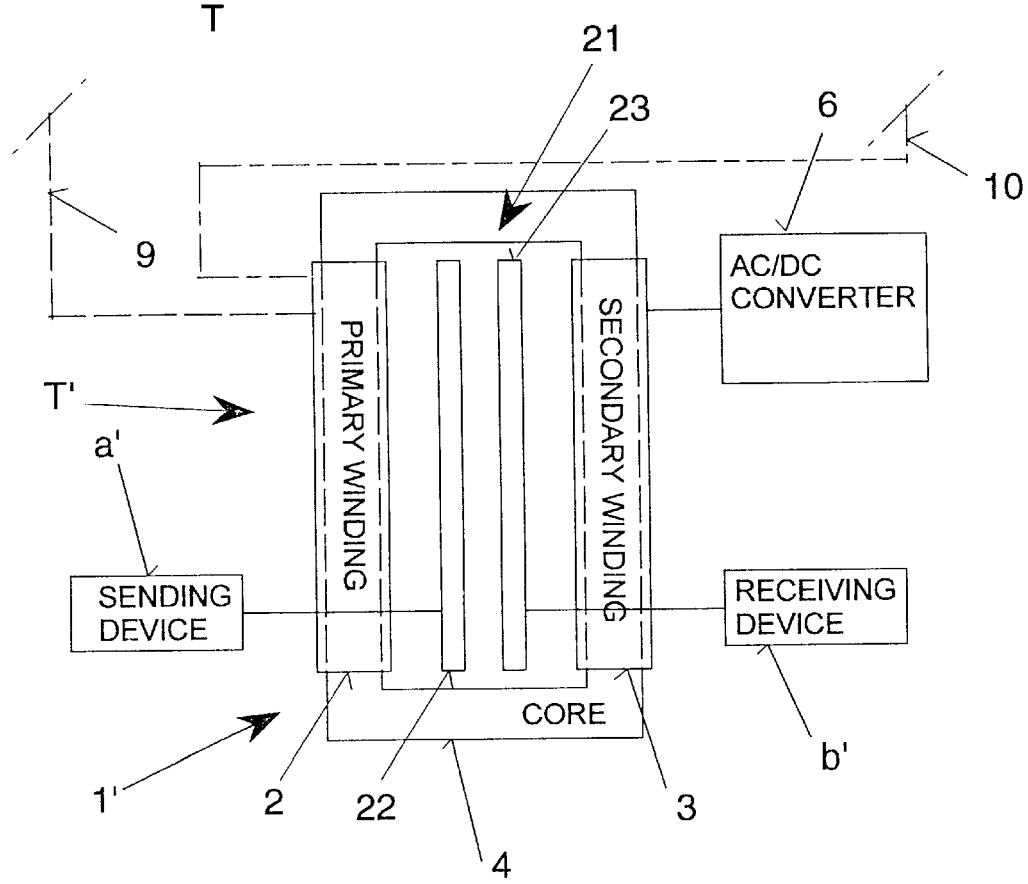
FIG. 2 shows a transmitting device to be connected downstream of the transmitting device of FIG. 1.
Figure 5:
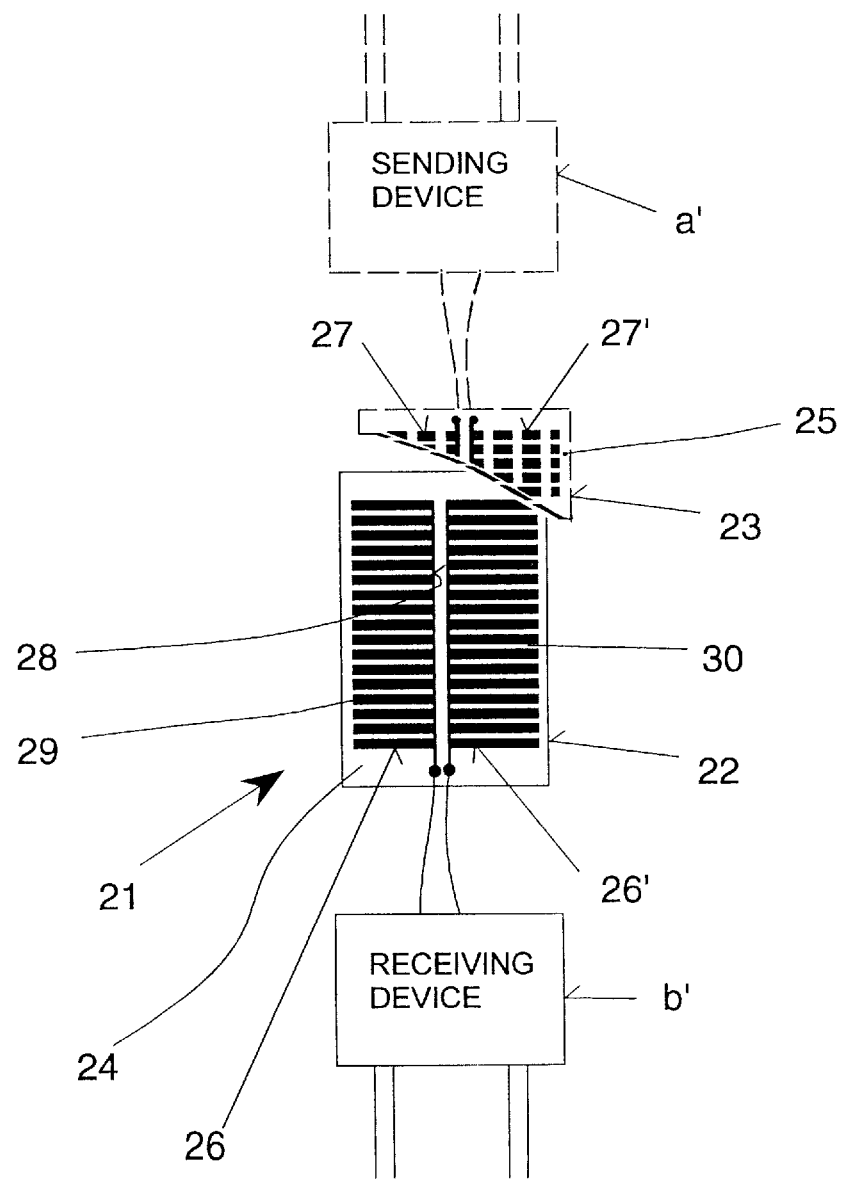
FIG. 5 is a representation of antennas comprised of capacitors for capacitively transmitting changing signals with devices according to FIGS. 1 to 3.

In the device 1' according to FIG. 2, which corresponds essentially to the design of the device 1 of FIG. 1, a data transmittal unit 21 for capacitively transmitting changing signals is provided. The antennas 22 and 23, embodied according to the design of FIG. 5, are arranged opposite one another and connected to a sending electronic device a' and a receiving electronic device b' and are in the form of capacitors 26, 26', 27, 27' connected to the rigid supports 24 and 25.

In order to prevent turbulence due to magnetic fields the capacitors 26, 26', 27, 27' having an identical size and arranged opposite one another are embodied in a special fashion. Connecting stays 28 are centrally arranged on the supports 24 and 25 and are provided with outwardly extending capacitor plates 29 so that slots 30 are formed. In order to suppress disturbances due to in-phase signals twin capacitors 26, 26' and 27, 27' are provided.

The device 1' is connected to the device according to FIG. 1. This may be achieved via lines 9 or 10 which may be connected with the connecting lines 7 or 8 connecting the inverter 5 and connecter 6 and the primary coil 2 or secondary coil 3 of the transformer T, respectively. In this manner a singular or multiple cascading of the primary coil as well as of the secondary coil of the transformer T' is possible.

Figure 3:
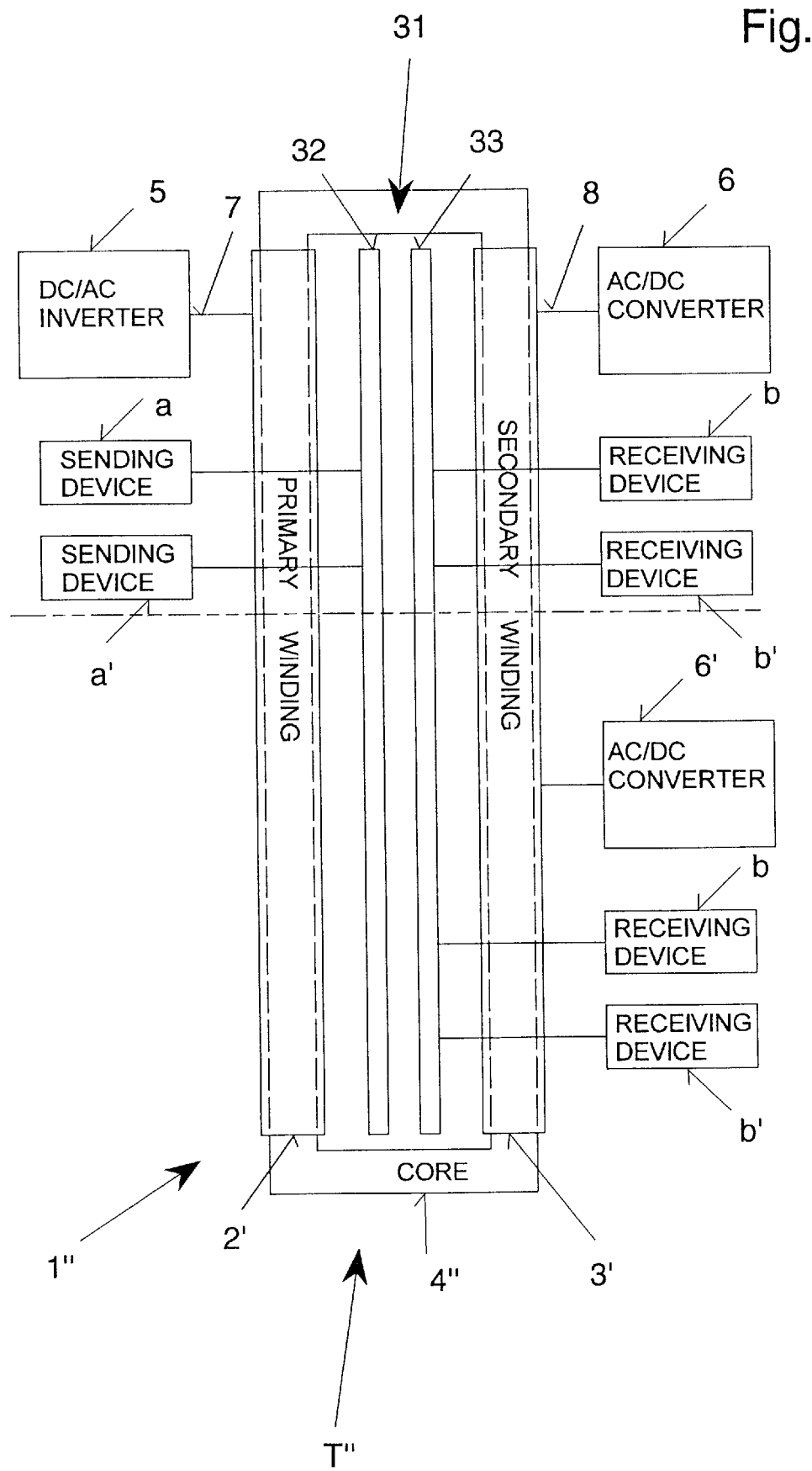
FIG. 3 is a further embodiment of the transmitting device according to FIGS. 1 and 2.
Figure 6:
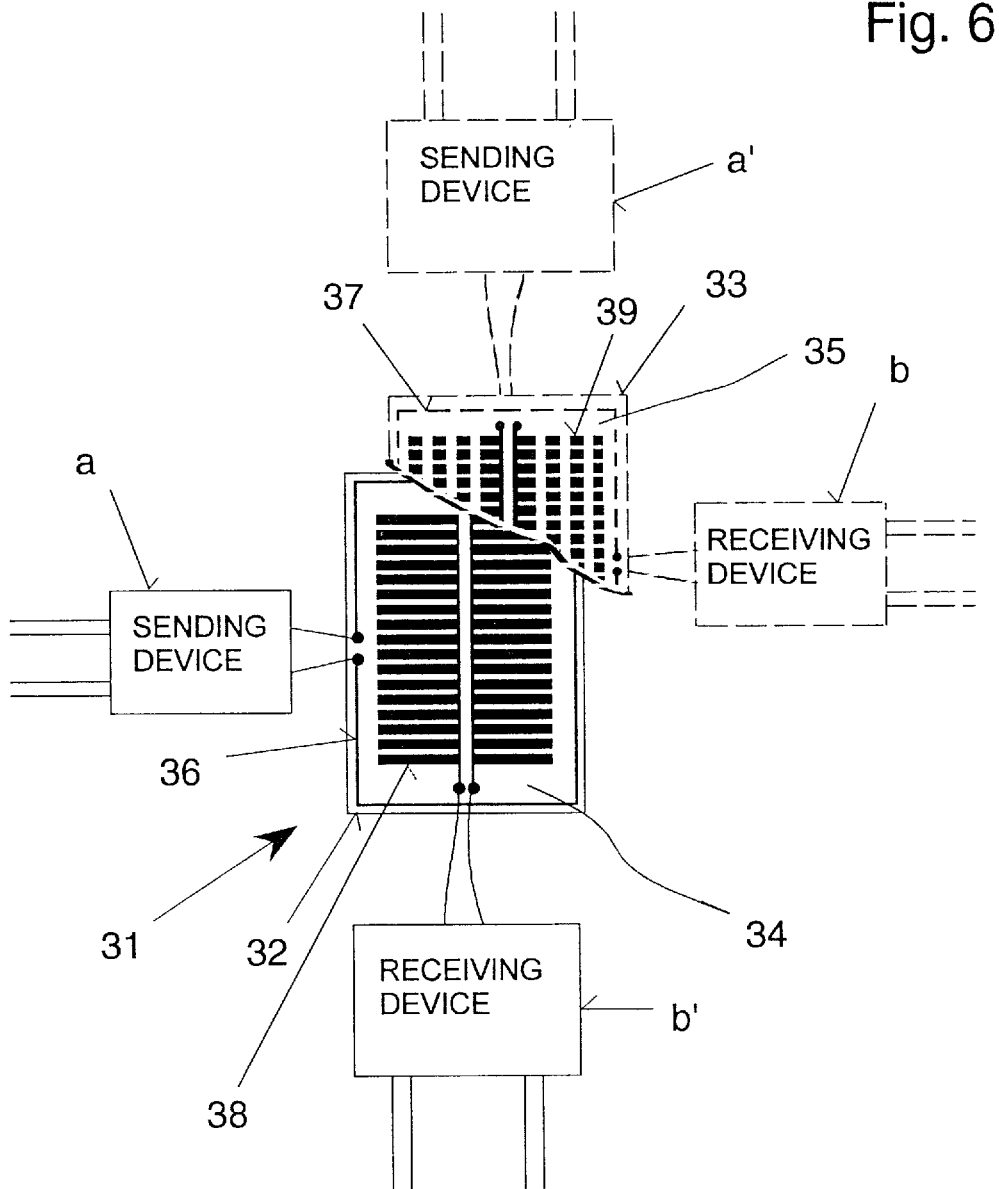
FIG. 6 is a device according to FIGS. 4 and 5 for inductively and capacitively transmitting signals with transmitting devices according to FIGS. 1 to 3.
Figure 7:
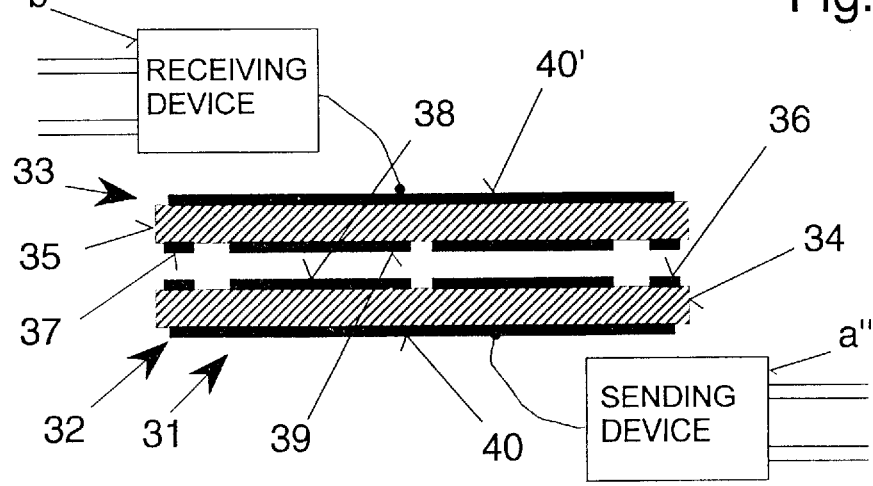
FIG. 7 shows a device according to FIG. 6 with shields provided at the backsides of the supports and serving as capacitors, the representation being in cross-section.

In the transmitting device 1'' according to FIG. 3 the data transmitting unit 31 is provided with oppositely arranged antennas 32 and 33 which are embodied according to FIG. 6 and are suitable for the inductive and capacitive transmittal of changing signals. For this purpose, closed leads in the form of conductive loops 36, 37 are attached to the supports 34 and 35 which are connected to the receiving electronic device b and the sending electronic device a. Also, capacitors 38 and 39 are fastened to the supports 34 and 35 and connected to the sending electronic device a' and the receiving electronic device b'. The conductive loops 36, 37 and the corresponding capacitors 38, 39 are arranged in a common plane, respectively. With the data transmittal unit 31 changing signals may thus be transmitted via two channels.

The transformer T" which is supplied with energy from the primary coil 2' via changing magnetization of the core 4", has a secondary coil 3' to which a further inverter 6' is connected. The antenna 33 is connected to two further receiving electronics device b and b' (i.e., the receiving channels are double). An additional consuming device may thus be provided with energy, and data may thus be transmitted via four receiving channels. Of course, it is also possible, as indicated in a dash-dotted separating line, to provide the transmitting device 1" with only two receiving channels for inductively and capacitively transmitting data.

In order to improve the transmittal behavior areally embodied shields 40 and 40' may be provided at the supports 34 and 35 on a side which is remote from the antennas 32 and 33. This is indicated in the sectional view of FIG. 7.

The shields 40 and 40' may also be used as capacitors. In order to achieve this, the shields 40 and 40' are to be connected to a sending electronic device a" and a receiving electronic device b".

The FIGS. 8 to 12 show a device 1 according to the schematic representation in FIG. 1 and provided with a data transmittal unit 31 in various possible constructive embodiments.

According to the FIGS. 8 and 9 the antennas 32 and 33 designed for the inductive and capacitive data transmittal are arranged within the coil window F of the transformer T. According to the embodiments represented in FIGS. 10 and 11 the antennas 32' and 33' surround the legs of the core 4. The conductive loops 36' and 36" are embodied in the form of a slotted rectangular ring into which the comb-shaped capacitors 38' and 38" are inserted.

In the embodiment according to FIG. 8 the core 4 of the transformer T as well as the shields 40 and 40' of the antennas 32 and 33 are also used as capacitors. For this purpose, the two outer end faces extending parallel to the air gap AG between the two halves 4" and 4"' of the core 4 are provided with an electrically conductive coating 101, respectively, 102, for example, in the form of a metallic lacquer film. Furthermore, the coatings 101, 102 as well as the shields 40, 40' of the antennas 32, 33 are commonly connected to the sending electronic device a" and the receiving electronic device b". The capacitors formed by the coatings 101 and 102, respectively, the halves 4" and 4"' of the core 4 as well as the capacitors formed by the shields 40, 40' are switched in a push-pull cycle by the receiving and sending electronics devices a" and b".

In the embodiment according to FIG. 8 the two halves 4" and 4"' of the core 4 are furthermore provided with coils 103 and 104 arranged transverse (orthogonal) to the primary coil 2 and the secondary coil 3 for inductively transmitting changing signals. With this embodiment it is accomplished that a current flowing within the primary coil 2 and/or the secondary coil 3 induces no current within the antennas 32, respectively, 33 because the current viewed over the entire surface area of the antennas 32, 33 vanishes at each point in time, i.e., is identical to zero.

In the transmiting device 51 according to FIGS. 12 to 14 a primary coil 52, a secondary coil 53, and a two-part core 54, 54' are provided for transmitting energy. For the transmittal of changing signals antennas 55 and 56, respectively, 57 and 58 are provided. In the embodiment according to FIGS. 12 and 13 the antennas 55 and 56 for inductive and capacitive transmittal are arranged between the legs of the core 54, 54'; in the embodiment according to FIG. 14 the antennas 57 and 58 surround (over) the central leg of the two-part core 54, 54' so that the two parts of the core may also be rotated relative to one another.

Figure 15:
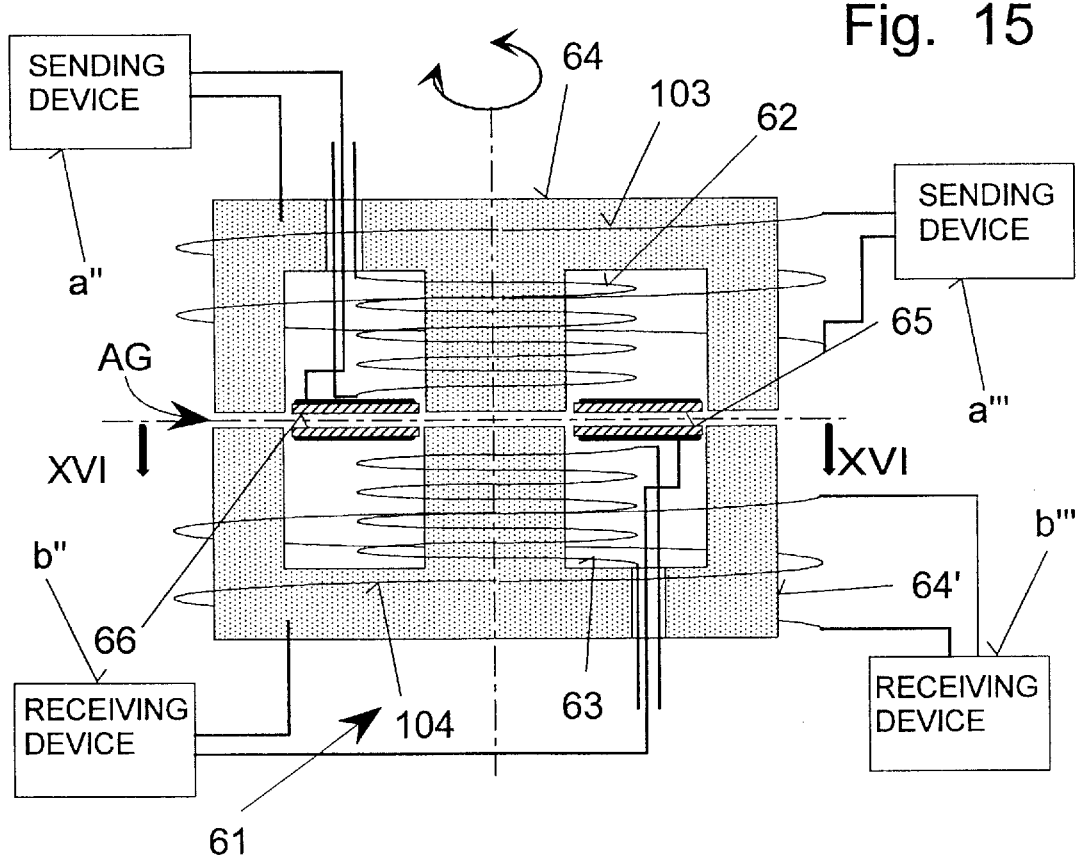
FIG. 15 is a transformer of a circular design with antennas arranged within the coil field.
Figure 16:
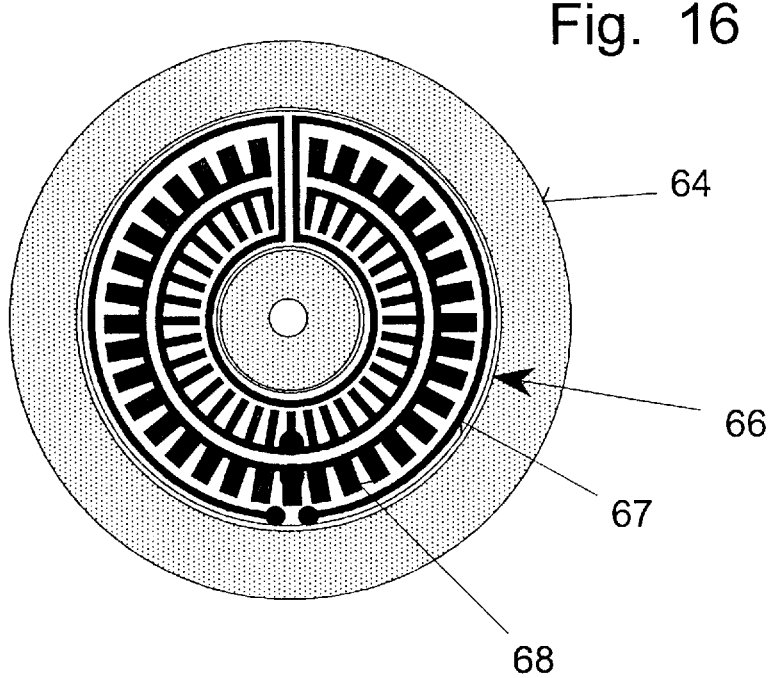
FIG. 16 is a section along the line XV—XV.

In the transmiting device 61 represented in FIGS. 15 and 16 the two parts of the core 64, 64' separated by the air gap AG may also be rotated relative to one another whereby the two parts 64, 64' support the primary coil 62 and the secondary coil 63. The antennas 65 and 66 arranged within the coil windows of the primary coil 62 and the secondary coil 63 are comprised of, as can be seen especially in FIGS. 16, a conductive loop 67 in the form of a continuous circular ring into which a comb-shaped capacitor 68 is introduced.

According to the embodiments of FIGS. 15 and 16 the primary coil 62 and the secondary coil 63 are provided with transversely (orthogonally) arranged coils 103 and 104 so that changing signals may be transmitted in an inductive manner. Furthermore, the two parts of the core 64, 64' are connected to sending and receiving electronics device a" and b" so that the two parts of the core 64, 64' may be used as capacitors.

Figure 17:
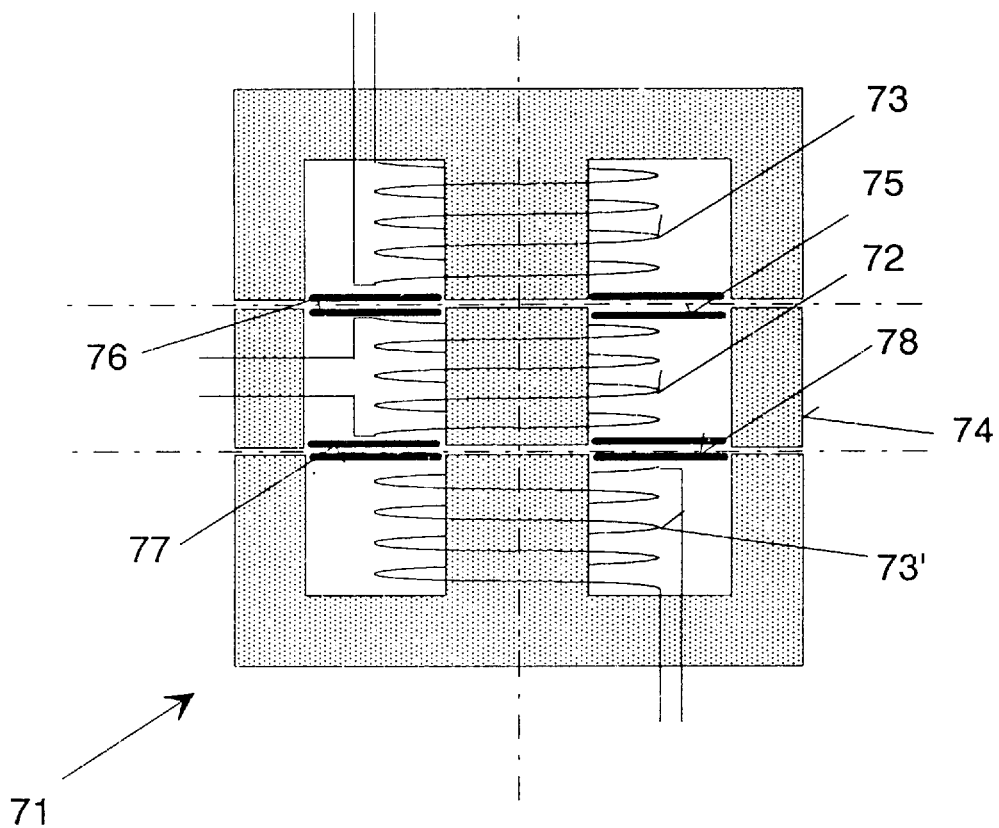
FIG. 17 is a multi-stage transformer with antennas in an axial sectional view.

The transmittal device 71 of FIG. 17 corresponds essentially to the schematically represented design of FIG. 3. A primary coil 72 has coordinated therewith two secondary coils 73 and 73' so that with the aid of the core 74 to be magnetized two consuming devices may be supplied with energy. Furthermore, four antennas arranged in pairs 75, 76 and 77, 78 are provided so that changing signals may be transmitted on two channels.

Figure 18:
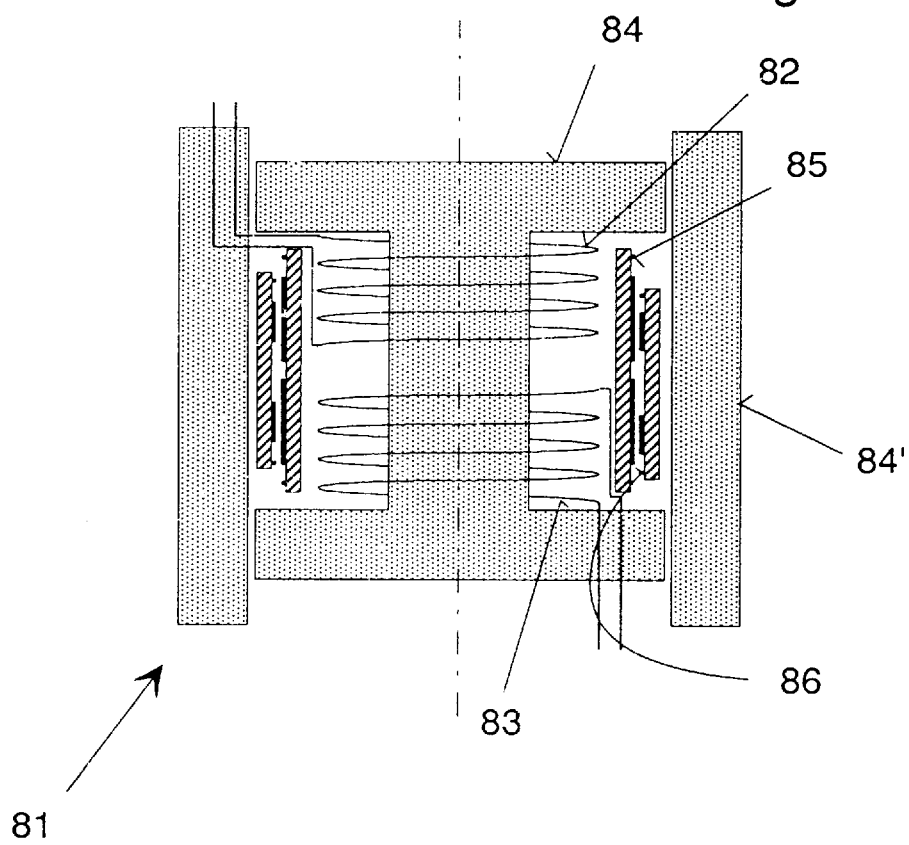
FIG. 18 is a transformer with antennas that are rotatable relative to one another.

In the transmitting device 81 according to FIG. 18 the core 84, 84' is two-part whereby the core part 84 is provided with the primary coil 82 and a secondary coil 83 as well as an antenna 85. A further antenna 86 cooperating with the antenna 85 is provided at the other core part 84' which is rotatable relative to the core part 84.

Figure 19:
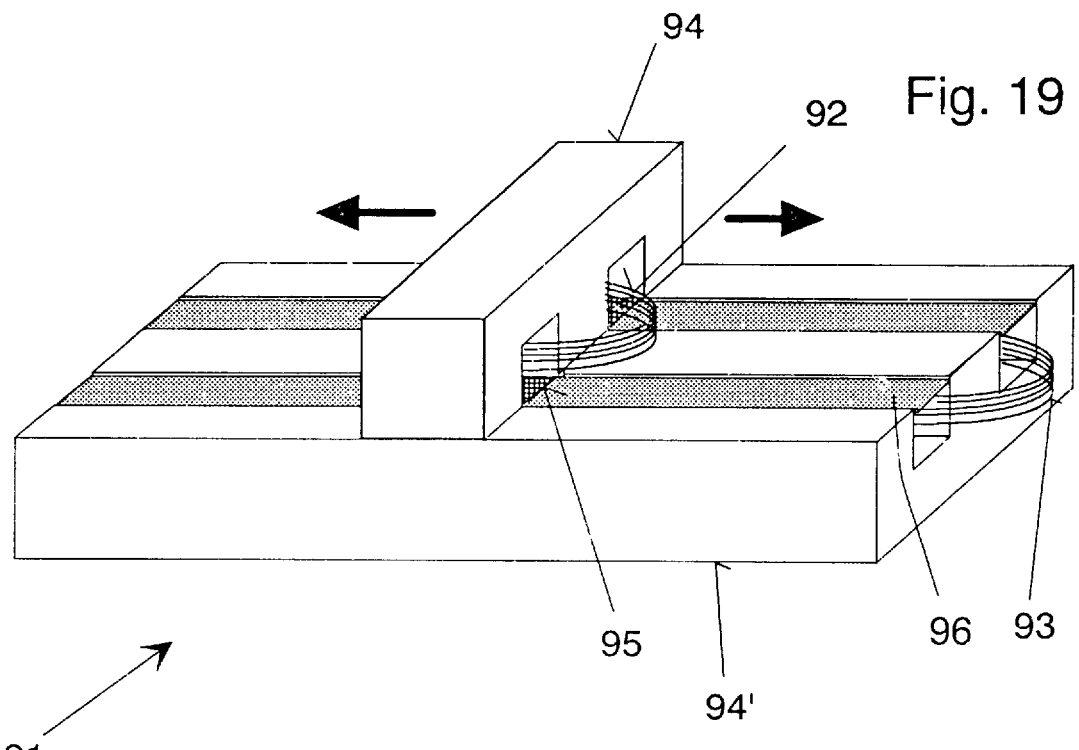
FIG. 19 shows a transmitting device with components that are linearly movable relative to one another.
Figure 20:
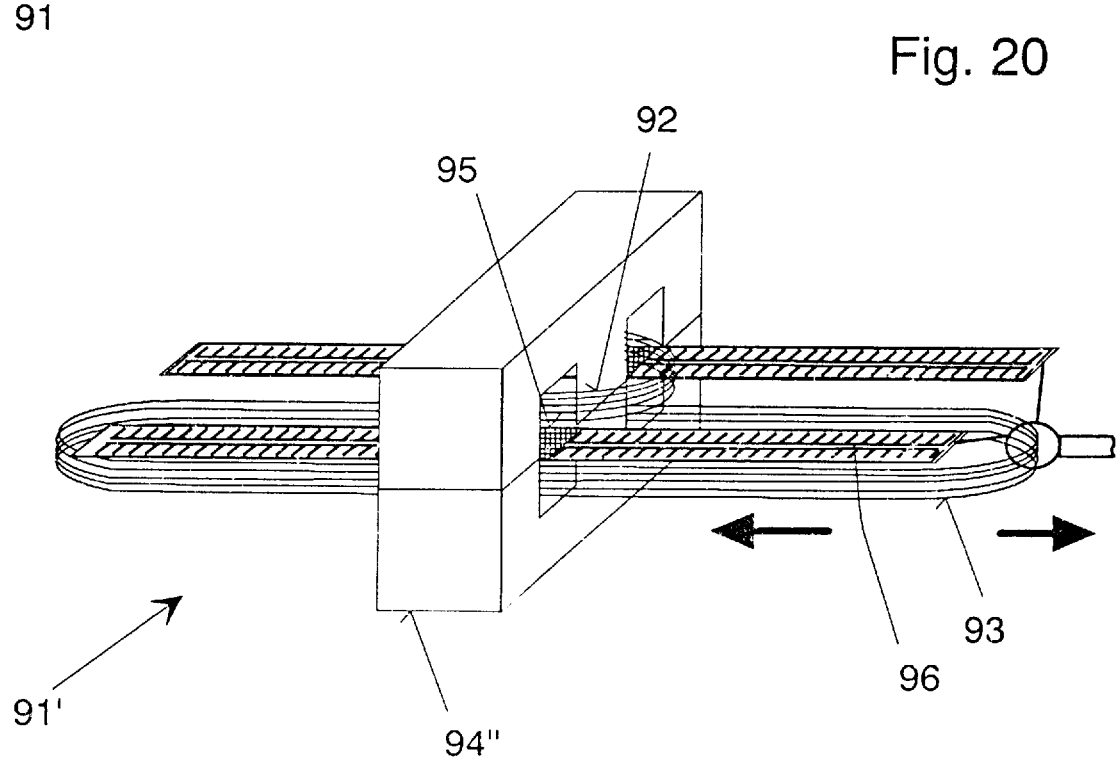
FIG. 20 shows a further embodiment of a transmitting device with components that are linearly adjustable relative to one another.

According to FIGS. 19 and 20 the transmiting devices 91, respectively, 91' have components that are linearly adjustable relative to one another. According to FIG. 19 the core part 94 which supports the primary coil 92 is axially slidable relative to the core part 94' which supports the secondary coil 93. An antenna 95 which is provided at the core part 94 is thus also axially slidable relative to the core part 94' supporting the antenna 96. In the embodiment according to FIG. 20 the secondary coil 93 and the correspondingly large antenna 96 are also linearly slidable or adjustable relative to the stationary core 94" with its primary coil 92 and the antenna 96 supported at the core 94".

In a further development of the present invention it is suggested to use microwave components for the inventive device as an inexpensive means for data transmission. Such microwave components can be used as antennas in the present invention. Suitable microwave components are well known and widely used for microwave-based telecommunication systems (telephones etc.). Microwave components can provide for a wide range of data transmission rates depending on the components selected. Such microwave components (antennas in the context of the present invention) can be used alone or in combination with the disclosed inventive antennas, i.e., it is possible to combine microwave antennas with the antennas shown in the embodiments of FIGS. 820.

Figure 22:
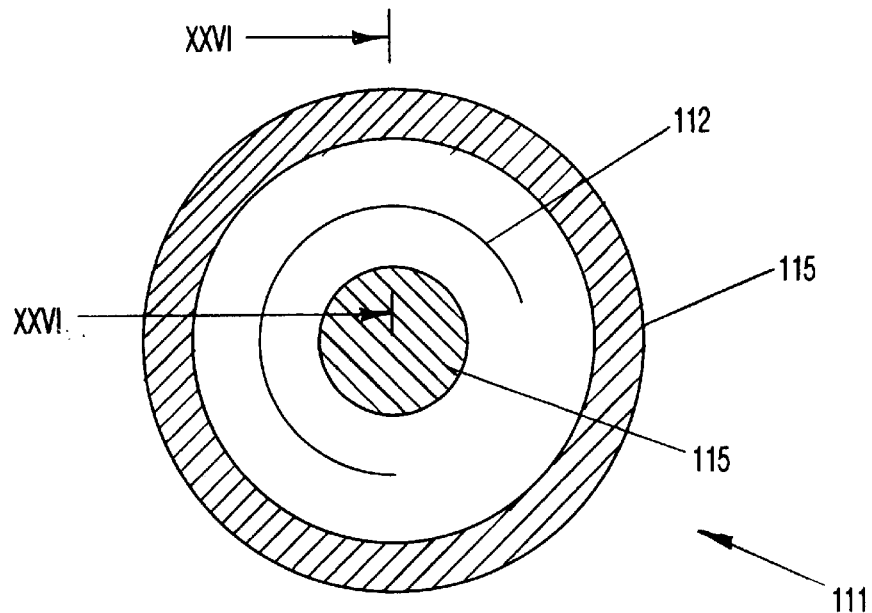
FIG. 22 is a schematic representation of the core and antenna arrangement of the inventive device for inductive energy transmission and data transmission via microwave antenna.

FIG. 22 shows a in a schematic representation the inventive device 111. Essentially, one half is shown with the core 115 and the microwave antenna 112 (sending or receiving antenna) that is positioned in proximity to the air gap. The sending or receiving electronic device (not represented) is connected with one pole to the antenna and with the other pole to a shielding device (113, see FIG. 26) or directly to the energy transmitting coil (114, see FIG. 26). For this purpose it is expedient to employ a coupling transformer. It is possible to provide the shielding device with a recess.

Figure 26:
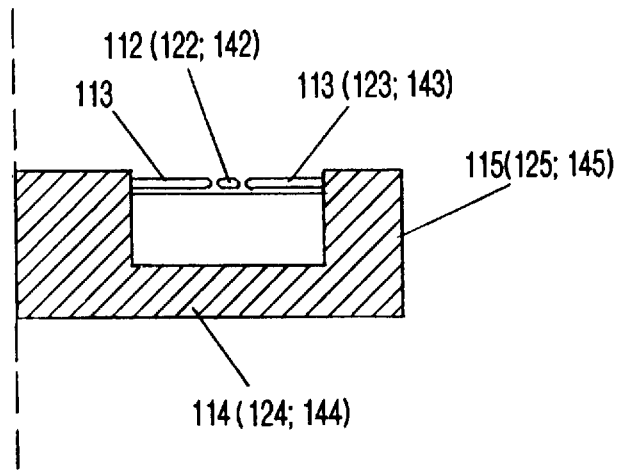
FIG. 26 shows a cross-section along line XXVI—XXVI in FIGS. 22, 23, and 25.

The cross-section along the line XXVI—XXVI of FIG. 22 represented in FIG. 26 shows the bottom half of the inventive device with the center line of the device being represented by a dash-dotted line to the left of the drawing. The ferrite core 115 has a recess in which the coil 114 with its windings is received. On top of the coil 114 the antenna 112 and the shielding device 1 13, surrounding the antenna 1 12 radially inwardly and radially outwardly, are positioned facing the air gap between the half of the device shown and the half of the device to be positioned mirror-symmetrically thereto (as shown, for example, in FIGS. 15 and 16).

Figure 23:
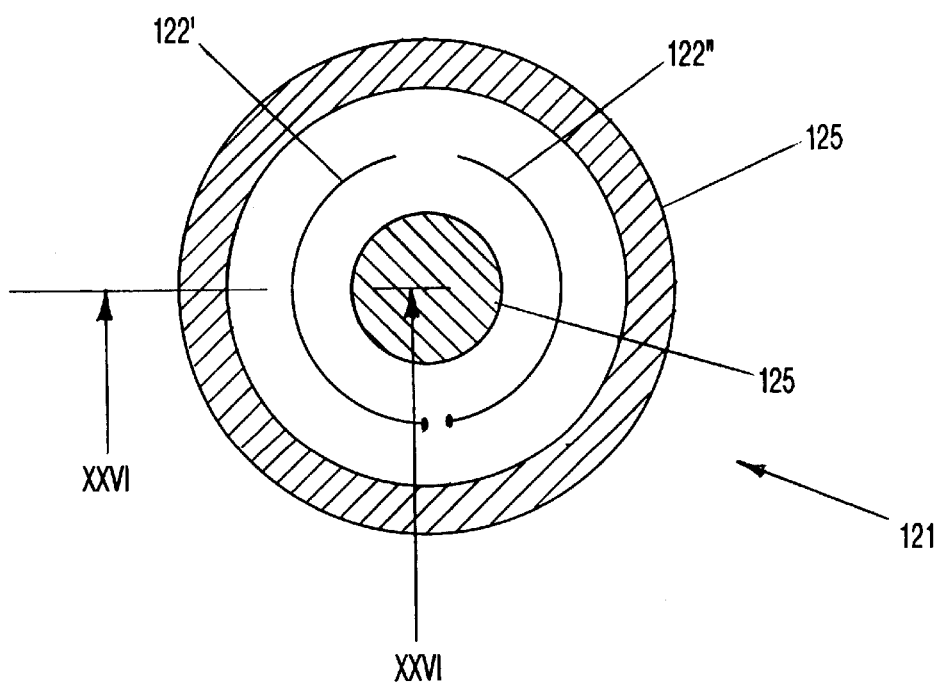
FIG. 23 shows schematically a further embodiment of the design according to FIG. 22 with a two-wire antenna.

In the embodiment of FIG. 23, the microwave antenna is a two-wire antenna 122', 122". A cross-section of the device along line XXVI–XXVI corresponds to the cross-section of the embodiment of FIG. 22 and is shown in FIG. 26. A shielding device 123 (see FIG. 26) can also be used and can have a cutout as shown in the drawing. The windings of the coil 124 are also positioned in a recess of the ferrite core 125.

Figure 25:
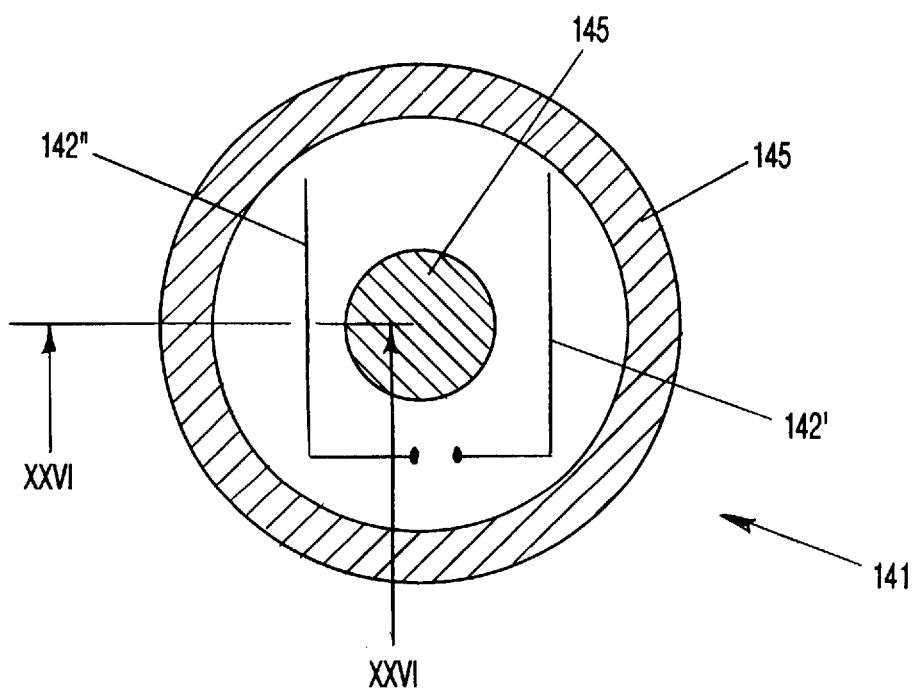
FIG. 25 shows a further schematic embodiment of FIG. 23 with an angular two-wire antenna arrangement.

A variation of the embodiment of FIG. 23 is shown in FIG. 25. Here the two-wire microwave antenna 142', 142" is positioned in an angular arrangement within the core 145. Otherwise, the embodiments are identical, and the cross-section along the line XXVI—XXVI is also shown in FIG. 26 illustrating the coil 144 and the shielding device 143. Such an angular arrangement is, of course, also possible for a single wire antenna as shown in FIG. 22.

Figure 24:
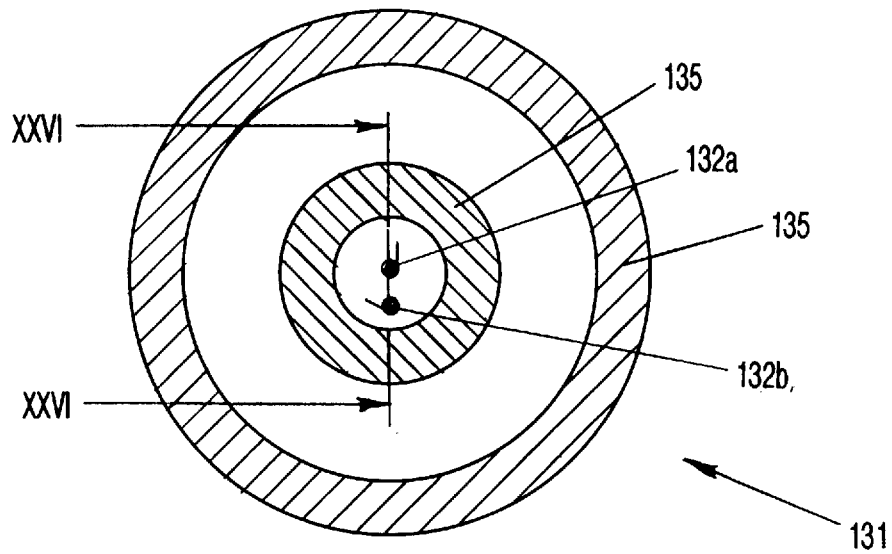
FIG. 24 shows schematically an alternative embodiment with the sending/receiving antennas arranged in the center of the inventive device.
Figure 27:
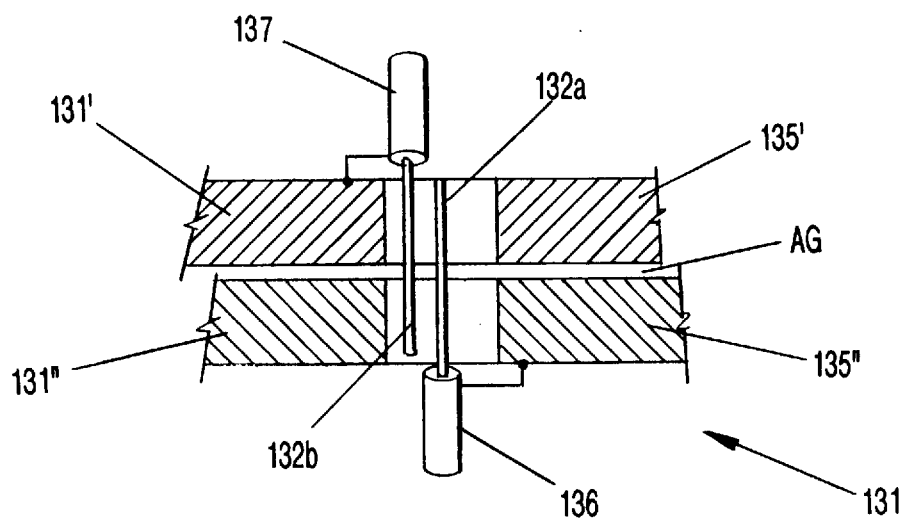
FIG. 27 shows a cross-section along line XXVII—XXVII in FIG. 24.

FIG. 24 shows another possible design for the use of microwave antennas. The sending and receiving antennas are schematically represented at 132a, 132b. One antenna 132a is arranged in the center of the inventive device 131 and the other antenna 132b is radially spaced at a short distance thereto so that the radially outwardly positioned antenna 132 can rotate freely about the centrally arranged antenna 132a when the halves of the device 131 are rotated relative to one another. The cross-section along the line XXVII—XXVII shown in FIG. 27 shows the air gap AG between the two halves of the device 131', 131". The reference potential of the antennas 132a, 132b is connected to the respective ferrite core 135', 135". It is also possible to construct the antenna 132b as a hollow cylinder positioned concentrically about the centrally arranged antenna 132a. This will improve coupling as well as increase shielding.

The inventive device can be used for data and energy transfer between machine parts that are moveable, (linearly) slidable, rotatable etc. relative to one another, for example, in machine tools, pumps, cranes, emergency generators, measuring devices, robot joints, video surveillance equipment, transporting devices, and any type of automated device. The inventive device is especially useful for replacing sliprings or mechanical contacts. The device with separate core halves can be used as a coupling or plug connection wherein the mating plug parts are moveable relative to one another to some extent which is especially useful for automatically coupling railway cars etc. because a mechanical fit (pin to be received in a pin hole) must no longer be insured. The field of application for the inventive device is expansive and not limited to the examples given above. A person skilled in the art will recognize the universal application of the device for the purpose of combined energy and data transfer and the resulting advantages.

The present invention is, of course, in no way restricted to the specific disclosure of the specification and drawings, but also encompasses any modifications within the scope of the appended claims.

What we claim is:

1. A device in the form of a transformer for transmitting electrical energy, said device comprising:
    a core of a ferromagnetic material;
    a primary coil and a secondary coil wound about said core;
    a receiving electronic device and a sending electronic device;
    at least one first areal antenna and at least one second areal antenna in direct vicinity of said primary and said secondary coils for a contact-free transmitting of changing signals, said at least one first and at least one second areal antennas connected interchangeably to said receiving electronic device and said sending electronic device to serve as a receiver and a sender, respectively, with said receiver and said sender forming a unit with said primary coil, said secondary coil, and optionally said core.

2. A device according to claim 1, further comprising rigid supports made of an insulating material, said first and second areal antennas each connected to one of said supports and arranged directly opposite one another.

3. A device according to claim 2, wherein said supports are shaped as a plate, a disk, a cylinder, a sphere, or a parallelepiped.

4. A device according to claim 2, wherein, for inductive transmittal of changing signals, said antennas connected to said supports are in the form of a printed circuit board.

5. A device according to claim 2, wherein, for inductive transmittal of changing signals, said antennas are in the form of at least one closed lead areally connected to said supports.

6. A device according to claim 5, wherein said closed lead is a conductive loop.

7. A device according to claim 6, wherein said conductive loop is a rectangle or a polygon.

8. A device according to claim 6, wherein said conductive loop is a discontinuous circular loop or a discontinuous rectangular loop.

9. A device according to claim 2, wherein, for capacitive transmittal of changing signals, said antennas are in the form of at least one capacitor areally connected to said supports.

10. A device according to claim 9, wherein said capacitor is selected from the group consisting of metal foil, a metallic lacquer film, and a circuit board.

11. A device according to claim 9, wherein said capacitor is comprised of two comb-shaped parts, each said comb-shaped part having a connecting stay and a plurality of capacitor plates spaced from one another, with said connecting stays centrally connected to said supports and with said capacitor plates of said capacitors facing outwardly.

12. A device according to claim 9, wherein said capacitor is comprised of at least two concentrically arranged, annular capacitor plates.

13. A device according to claim 12, wherein said capacitor has slots.

14. A device according to claim 13, wherein said slots extend radially.

15. A device according to claim 1, wherein said antennas each are formed of closed leads in the form of conductive loops and capacitors for inductively and/or capacitively transmitting changing signals.

16. A device according to claim 15, wherein said capacitors are comb-shaped and arranged within said conductive loops, wherein said loops are rectangular loops and wherein said rectangular loops are optionally discontinuous.

17. A device according to claim 15, wherein said capacitors are annularly shaped and inserted into a conductive loop formed as a discontinuous circular ring.

18. A device according to claim 17, wherein said capacitors have radially extending slots.

19. A device according to claim 2, wherein said supports, on a side thereof remote from said antennas, have an areal shield.

20. A device according to claim 19, wherein, for transmitting changing signals, said areal shields are respectively connected to said sending electronic device and said receiving electronic device.

21. A device according to claim 2, wherein said core of said transformer has two halves, each said half respectively connected to said sending electronic device and said receiving electronic device for using said core as a capacitor.

22. A device according to claim 21, wherein between said two halves an air space is formed and each said half has an end face remote from said air space and extending parallel to said air space, said end faces coated with an electrically conductive coating.

23. A device according to claim 22, wherein said electrically conductive coating is a metallic lacquer film.

24. A device according to claim 21, wherein said supports, on a side thereof remote from said antennas, have an areal shield, with said areal shields and said two halves of said core connected to a common one of said sending electronic device and a common one of said receiving electronic device for use as capacitors and switchable in push-pull operation.

25. A device according to claim 21, wherein, for inductively transmitting changing signals, said two halves each have a further coil arranged transverse to said primary coil and said secondary coil, respectively, and connected to said sending electronic device and said receiving electronic device, respectively.

26. A device according to claim 1, wherein said primary coil and said secondary coil are adjustable relative to one another.

27. A device according to claim 26, wherein said primary coil and said secondary coil are linearly slidable relative to one another.

28. A device according to claim 27, wherein said primary coil and said secondary coil are of a different size in the direction in which they are linearly slidable.

29. A device according to claim 26, wherein said primary coil and said secondary coil are rotatable relative to one another.

30. A device according to claim 1, wherein said antennas are adjustable relative to one another.

31. A device according to claim 30, wherein said antennas are linearly slidable relative to one another.

32. A device according to claim 31, wherein said antennas are of a different size in the direction in which they are linearly slidable.

33. A device according to claim 30, wherein said antennas are rotatable relative to one another.

34. A device according to claim 1, wherein at least one of said primary coils has coordinated thereto at least one of said secondary coils, and wherein at least one of said antennas coordinated with said primary coil has coordinated thereto at least one antenna coordinated with said secondary coil.

35. A device according to claim 1, wherein said transformer has a coil window, with said antennas arranged in pairs in said coil window.

36. A device according to claim 35, wherein said antennas are in the form of at least one discontinuous rectangle.

37. A device according to claim 35, wherein said antennas are in the form of at least one discontinuous circular ring.

38. A device according to claim 1, wherein said antennas are in the form of at least one rectangular discontinuous ring surrounding legs of said core.

39. A device according to claim 1, further comprising a housing wherein said antennas are individually and at least partially enclosed.

40. A device according to claim 39, wherein said housing is made of a ferromagnetic material.

41. A device according to claim 1, further comprising a housing wherein said antennas are commonly and at least partially enclosed.

42. A device according to claim 41, wherein said housing is made of a ferromagnetic material.

* * * * *